United States Patent
Singh et al.

(10) Patent No.: US 8,509,188 B1
(45) Date of Patent: Aug. 13, 2013

(54) BUFFERING USER DATA IN A CORE NETWORK INTERFACE FOR DELIVERY OVER A WIRELESS ACCESS NETWORK

(75) Inventors: Jasinder Pal Singh, Olathe, KS (US); Anthony Kit-yui Leung, Kansas City, MO (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 13/028,347

(22) Filed: Feb. 16, 2011

(51) Int. Cl.
*H04W 4/00* (2009.01)
*H04W 36/00* (2009.01)
*H04J 3/16* (2006.01)
*H04J 3/22* (2006.01)

(52) U.S. Cl.
USPC .......................... 370/331; 370/466; 455/436

(58) Field of Classification Search
USPC .......................... 370/331, 466, 436; 455/436
See application file for complete search history.

(56) References Cited

U.S. PATENT DOCUMENTS

| | | | |
|---|---|---|---|
| 7,843,878 B2 * | 11/2010 | Morales et al. | 370/331 |
| 8,331,934 B1 * | 12/2012 | Khalil et al. | 455/436 |
| 2002/0057658 A1 * | 5/2002 | Lim | 370/331 |
| 2005/0169249 A1 * | 8/2005 | Shirota et al. | 370/352 |
| 2005/0281227 A1 * | 12/2005 | Vedder et al. | 370/331 |
| 2007/0014259 A1 | 1/2007 | Fajardo et al. | |
| 2007/0091848 A1 | 4/2007 | Karia et al. | |
| 2007/0207804 A1 | 9/2007 | Sharma et al. | |
| 2010/0062774 A1 | 3/2010 | Motegi et al. | |
| 2012/0208540 A1 * | 8/2012 | Kim et al. | 455/436 |

* cited by examiner

*Primary Examiner* — Asad Nawaz
*Assistant Examiner* — Nicholas Jensen

(57) ABSTRACT

In a communication system, a core network interface receives user data for a wireless communication device and transfers the user data to the device over a first access network. A second access network receives a service request from the wireless communication device and transfers a buffer initiation signal to the core network interface. The second access network establishes a wireless link to the wireless communication device and transfers a packet connection request to the core network interface. The core network interface receives more user data for the wireless communication device, buffers the additional user data responsive to the buffer initiation signal, and transfers the user data to the first access network for delivery to the device. The core network interface establishes a packet connection to the wireless communication device and transfers the buffered user data to the device over the second access network.

16 Claims, 7 Drawing Sheets

US 8,509,188 B1

BUFFERING USER DATA IN A CORE NETWORK INTERFACE FOR DELIVERY OVER A WIRELESS ACCESS NETWORK

TECHNICAL BACKGROUND

A wireless communication device may be configured to engage in data sessions over multiple wireless access networks. In some scenarios, the wireless communication device is limited, so it cannot simultaneously use the wireless access networks at the same time. In these scenarios, the wireless communication device performs a hand-over from one wireless access network to another. During the handover, data transferred over the old wireless access network may be lost as the wireless communication device transitions to the new wireless access network.

For example, wireless phones exchange Internet data over a Code Division Multiple Access (CDMA) 1x network and an Evolution Data Optimized (EVDO) network. Some of the wireless phones cannot use both of the wireless access networks at the same time. If one of these wireless phones is performing a handover from the CDMA 1x network to the EVDO network, then data sent to the wireless phone over the CDMA 1x network may be lost during the handover.

OVERVIEW

In a communication system, a core network interface receives user data for a wireless communication device and transfers the user data to the device over a first access network. A second access network receives a service request from the wireless communication device and transfers a buffer initiation signal to the core network interface. The second access network establishes a wireless link to the wireless communication device and transfers a packet connection request to the core network interface. The core network interface receives more user data for the wireless communication device, buffers the additional user data responsive to the buffer initiation signal, and transfers the user data to the first access network for delivery to the device. The core network interface establishes a packet connection to the wireless communication device and transfers the buffered user data to the device over the second access network.

DETAILED DESCRIPTION

Figure 1:
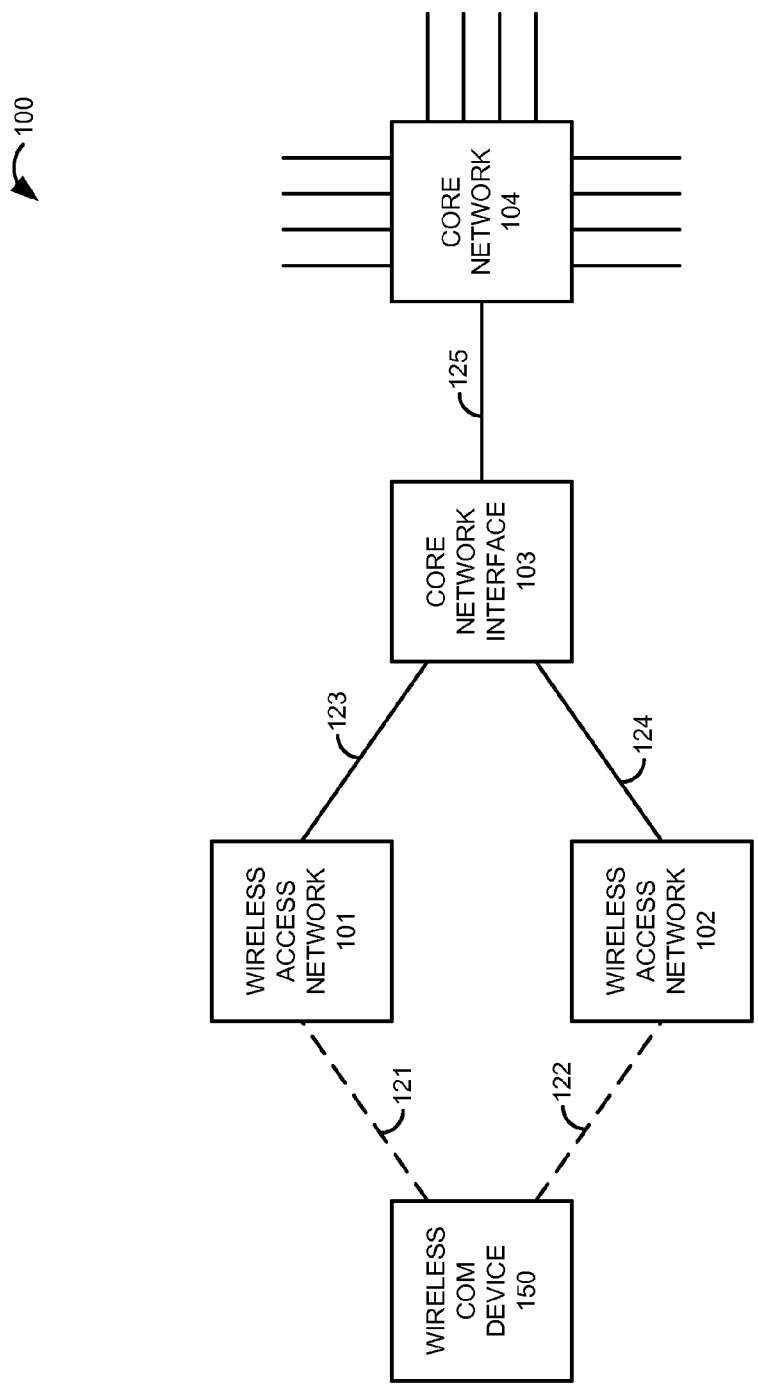
FIG. 1 illustrates a communication system where a core network interface buffers data for transfer over a wireless access networks.

FIG. 1 illustrates communication system 100. Communication system 100 comprises wireless access networks 101-102, core network interface 103, core network 104, and wireless communication device 150. Wireless communication device 150 and wireless access networks 101-102 communicate over respective wireless links 121-122. Core network interface 103 and wireless access networks 101-102 communicate over respective network links 123-124. Core network interface 103 and core network 104 communicates over core link 125.

Core network 104 exchanges data with various systems and transfers data that is directed to wireless communication device 150 to core network interface 103. If wireless access network 101 is currently serving wireless communication device 150, then core network interface 103 transfers the data to wireless access network 101 for delivery to wireless communication device 150. However, if wireless access network 102 is currently serving wireless communication device 150, then core network interface 103 transfers the data to wireless access network 101 for delivery to wireless communication device 150. Thus, wireless communication device 150 may use either one of wireless access networks 101-102 to access their data. Typically, wireless communication device 150 switches between access networks 101-102 based on the active applications, comparative signal strength, and/or some other metric.

Figure 2:
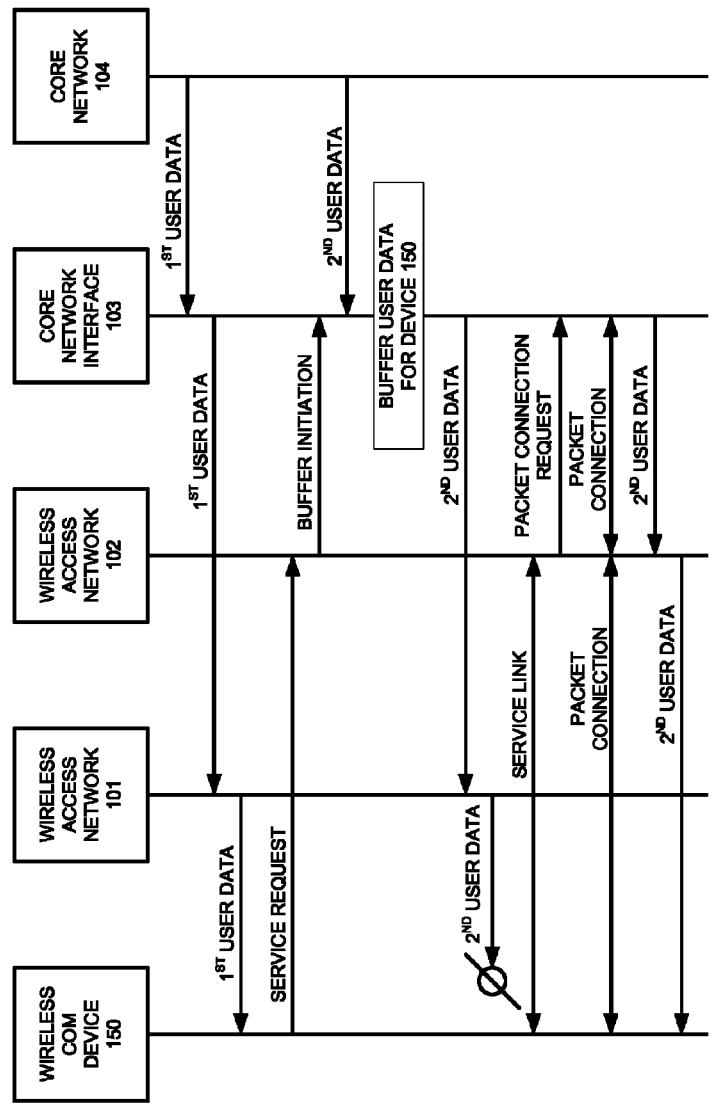
FIG. 2 illustrates the operation of a communication system where a core network interface buffers data for transfer over a wireless access network.

FIG. 2 illustrates the operation of communication system 100. Core network 104 transfers $1^{st}$ user data to core network interface 103 for delivery to wireless communication device 150. Since wireless access network 101 is currently serving wireless communication device 150, core network interface 103 transfers the $1^{st}$ user data to wireless access network 101, and wireless access network 101 transfers the $1^{st}$ user data to wireless communication device 150.

Wireless communication device 150 initiates a switch from wireless access network 101 to wireless access network 102 by sending a service request to wireless access network 102. In response to the service request, wireless access network 102 transfers a buffer initiation signal for wireless communication device 150 to core network interface 103. In response to the service request, wireless access network 102 also begins to set-up a wireless service link for wireless communication device 150.

Core network interface 103 receives $2^{nd}$ user data from core network 104 for delivery to wireless communication device 150. In response to the buffer initiation signal, core network interface 103 buffers the $2^{nd}$ user data. Since access network 101 is still the network of record as serving wireless communication device 150, core network interface 103 transfers the $2^{nd}$ user data to wireless access network 101, and wireless access network 101 attempts to transfer the $2^{nd}$ user data to wireless communication device 150. Since wireless communication device 150 is actively switching access networks, device 150 does not receive the $2^{nd}$ user data.

When the wireless service link between wireless access network 102 and wireless communication device 150 is active, wireless access network 102 transfers a packet connection request for device 150 to core network interface 103. Core network interface 103 establishes the packet connection to wireless communication device 150 over wireless access network 102 and the wireless service link. After the packet connection is active, core network interface 103 transfers the $2^{nd}$ user data from the buffer to wireless access network 102. Wireless access network 102 then transfers the $2^{nd}$ user data to wireless communication device 150.

Note that wireless access network 102 initiates the data buffering in core network interface 103 in response to the initial service request from wireless communication device 150. Wireless access network 102 then establishes the wireless service link and packet connection for wireless communication device 103. Once the packet connection is active, the buffered user data is delivered to wireless communication device 150. This system inhibits data loss during the access network handover.

Figure 3:
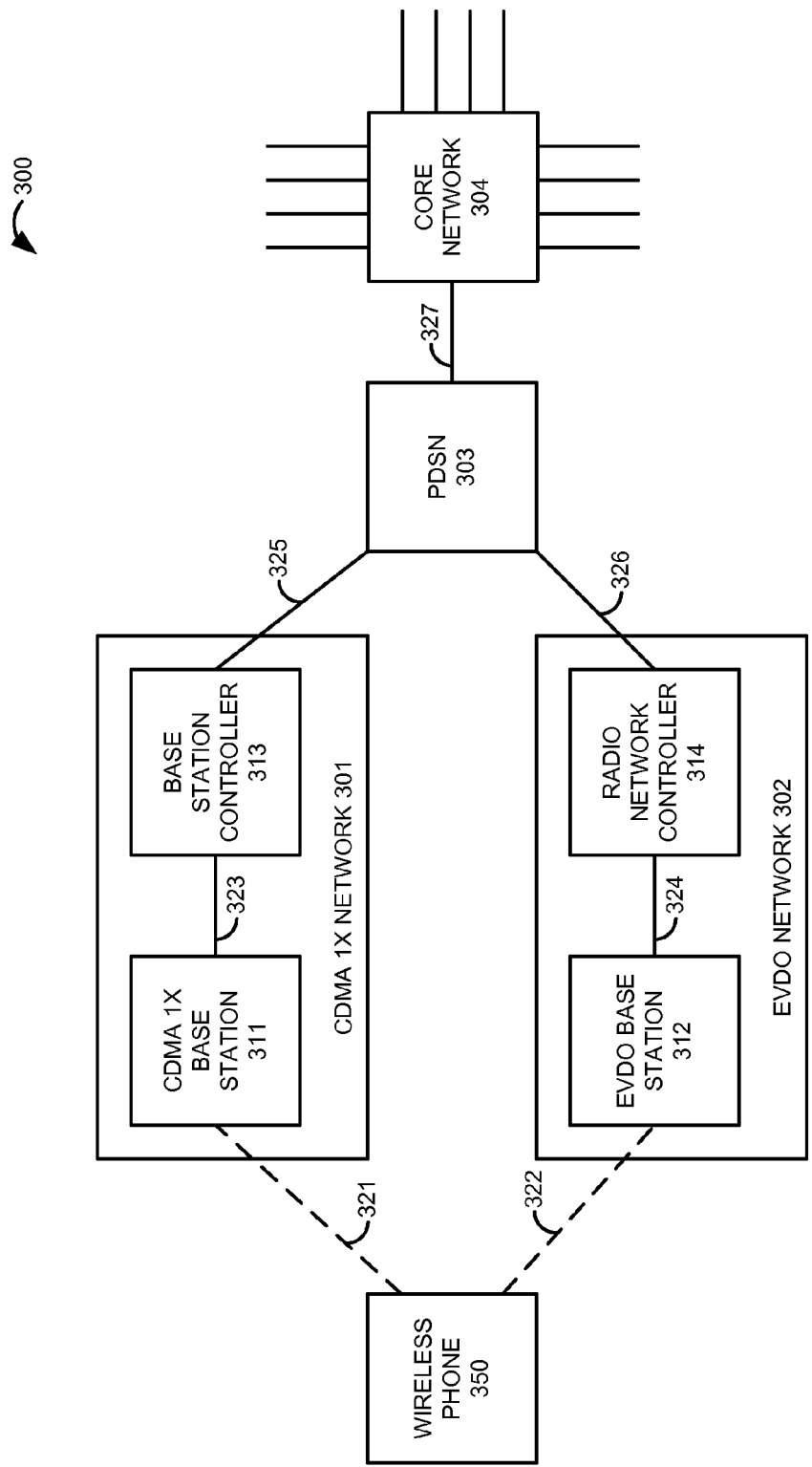
FIG. 3 illustrates a communication system where a PDSN buffers data for transfer over an EVDO network.

FIG. 3 illustrates communication system 300. Communication system 300 provides an example of communication system 100, although system 100 may use alternative protocols, configurations, and/or operations. Communication system 300 comprises Code Division Multiple Access (CDMA) 1x network 301, Evolution Data Optimized (EVDO) network 302, Packet Data Serving Node (PDSN) 303, core network 304, and wireless phone 350. CDMA 1x network 301 comprises CDMA 1x base station 311 and Base Station Controller (BSC) 313. EVDO network 302 comprises EVDO base station 312 and Radio Network Controller (RNC) 314.

Wireless phone 350 and base stations 311-312 communicate over respective wireless links 321-322. CDMA 1x base station 311 and BSC 313 communicate over backhaul link 323. EVDO base station 312 and RNC 314 communicate over backhaul link 324. PDSN communicates with BSC 313 and RNC 314 over respective network links 325-326. PDSN communicates with core network 304 over core link 327.

Wireless phone 350 does not simultaneously communicate with base stations 311-312. Instead, wireless phone 350 selects between base stations 311-312 based on signal strength, active applications, and/or some other metric. Wireless phone 350 uses CDMA 1x network 301 for voice calls and page messages, and phone 350 typically uses EVDO network 302 for data services, such as Internet access. In a scenario referred to as a hand-down, wireless telephone 350 and PDSN 303 use CDMA 1x network 301 for data services. In a hand-down scenario, PDSN 303 transfers data to wireless phone 350 using page messages (data pages) over CDMA 1x network 301.

Figure 4:
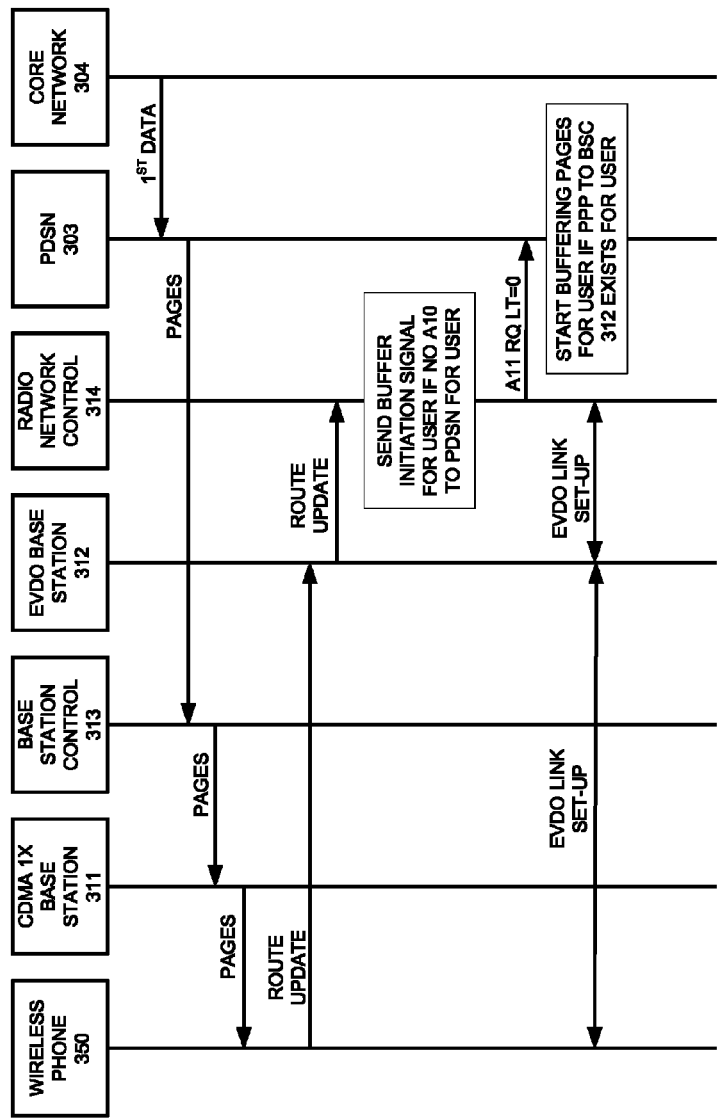
FIG. 4 illustrates the operation of a communication system where a PDSN buffers data for transfer over an EVDO network.

FIG. 4 illustrates the operation of communication system 300. Prior to the operation on FIG. 4, PDSN 303 and wireless phone 350 are using CDMA 1x network 301 for an Internet data session. Picking up the operations at the top of FIG. 4, core network 304 transfers a first data set to PDSN 303 for delivery to wireless phone 350. Since wireless phone 350 is currently served by CDMA 1x network 301, PDSN 303 transfers data pages with the first data set to BSC 313, and BSC 313 transfers the data pages to CDMA 1x base station 311. CDMA 1x base station 311 wirelessly transfers the data pages to wireless phone 350.

Wireless phone 350 initiates a handover from CDMA 1x network 301 to EVDO network 302 for the data session—typically because either the signal strength or capacity of EVDO network 302 has improved. To initiate the handover, wireless phone 350 transfers a Route Update Message (RUM) to EVDO base station 312 which forwards the RUM to RNC 314. In response to the RUM, RNC 314 checks if it already has an A10 session with PDSN 303 for wireless phone 350. If RNC 314 already has an A10 session with PDSN 303 for wireless phone 350, then operations may proceed in a conventional manner since PDSN 303 may use the existing session to deliver data to wireless phone 350.

If RNC 314 does not have an A10 session with PDSN 303 for wireless phone 350, then RNC 314 transfers a request for an A11 session (A11 RQ) for wireless phone 350, but the A11 RQ indicates a lifetime of zero (LT=0). This A11 RQ with LT=0 is a dummy request that operates as a buffer initiation signal to PDSN 303 for wireless phone 350. Contemporaneously, wireless phone 350, EVDO base station 312, and BSC 314 are setting up an EVDO wireless service link.

In response to the buffer initiation signal (A11 RQ with LT=0), PDSN 303 determines if it has a Point-to-Point Protocol (PPP) connection to BSC 313 or another RNC for wireless phone 350. If there is no PPP connection to BSC 313 or other RNC for phone 350, then phone 350 does not have an existing data session that is appropriate for buffering. If there is a PPP connection to BSC 313 or another RNC for phone 350, then PDSN 303 initiates a buffer for wireless phone 350 responsive to the buffer initiation signal.

Figure 5:
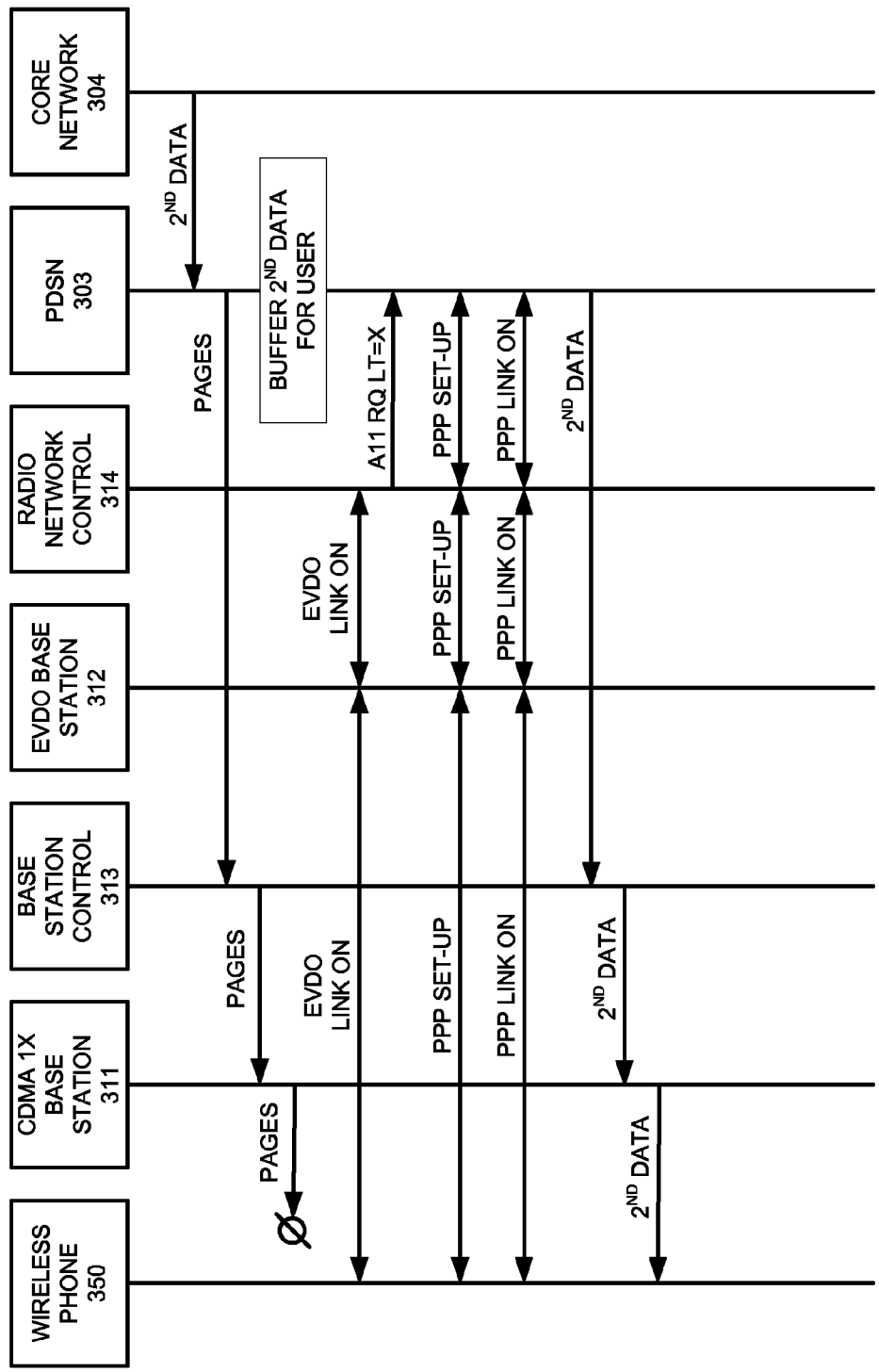
FIG. 5 illustrates the operation of a communication system where a PDSN buffers data for transfer over an EVDO network.

FIG. 5 continues to illustrate the operation of communication system 300. While the EVDO wireless service link is being established, core network 304 transfers a second data set to PDSN 303 for delivery to wireless phone 350. Since CDMA 1x network 301 is on record as serving wireless phone 350, PDSN 303 transfers data pages with the second data set to BSC 313, and BSC 313 transfers the data pages to CDMA 1x base station 311. CDMA 1x base station 311 attempts to wirelessly transfer the data pages to wireless phone 350, but phone 350 does not receive the data pages because it is busy establishing the EVDO link. PDSN 303 also buffers the second data set for wireless phone 350 responsive to the buffer initiation signal.

At this point, the EVDO link between wireless phone 350 and RNC 314 becomes available (ON), and in response, RNC 314 transfers a packet connection request—an A11 session request with a normal lifetime (A11 RQ with LT=X). In response to the A11 RQ with LT=X, PDSN 303 and wireless phone 350 set-up a PPP connection through EVDO base station 312 and RNC 314. When the PPP connection becomes available (ON), then PDSN 303 transfers the second data set to wireless phone 350 over RNC 214 and EVDO base station 312. PDSN 303 also releases the buffer for wireless phone 350.

Figure 6:
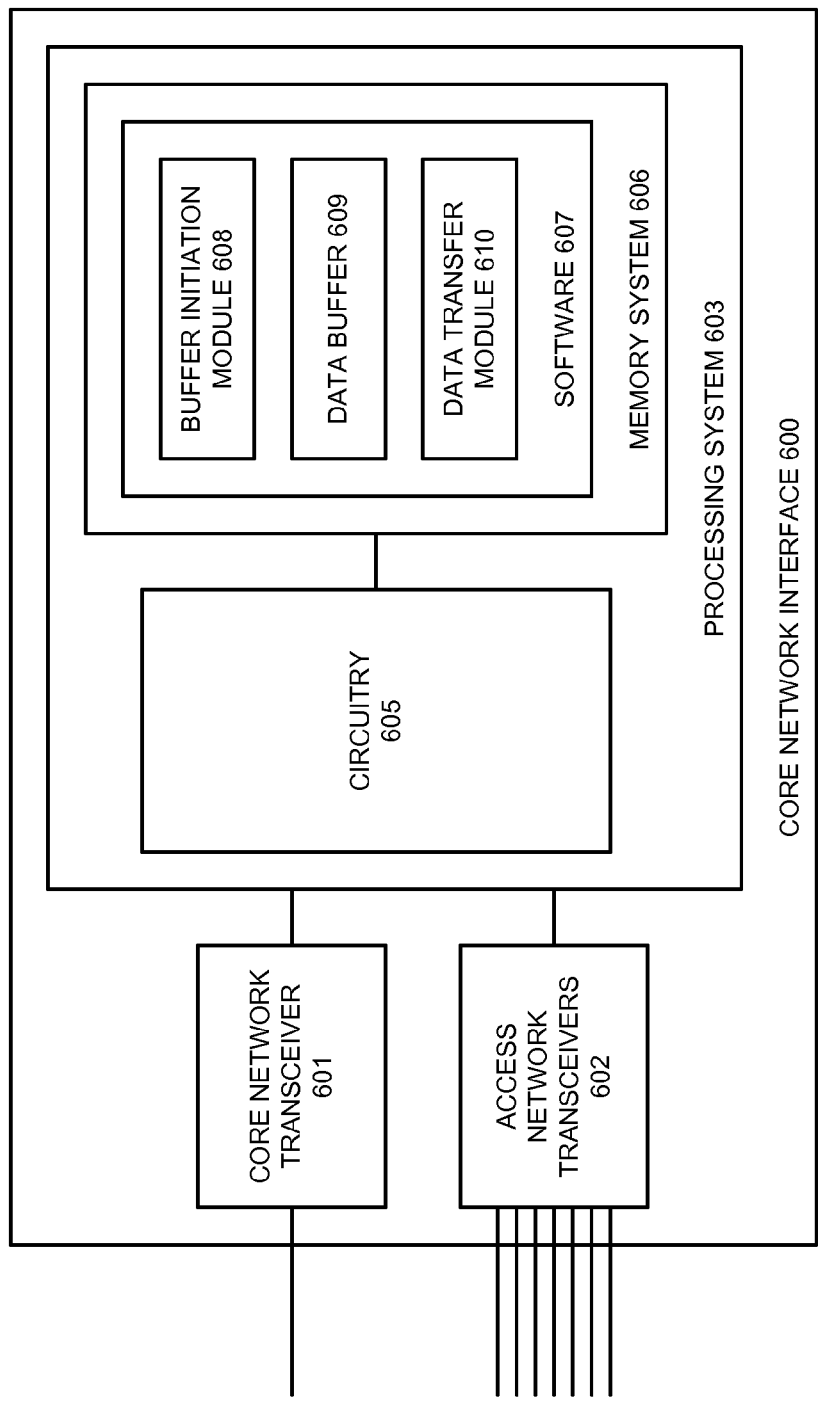
FIG. 6 illustrates a core network interface that buffers data for transfer over a wireless access network.

FIG. 6 illustrates core network interface 600. Core network interface 600 is an example of core network interface 103 and PDSN 303, although these systems may use alternative configurations and operations. Core network interface 600 comprises core network transceiver 601, access network transceivers 602, and processing system 603. Processing system 603 is linked to transceivers 601-602. Processing system 603 includes processing circuitry 605 and memory system 606 that stores operating software 607. Operating software 607 comprises software modules 608-610.

Core network transceiver 601 comprises components that communicate over communication links, such as network cards, ports, RF transceivers, processing circuitry and software, or some other communication apparatus. Core network transceiver 601 may be configured to communicate over metallic, wireless, or optical links. Core network transceiver 601 may be configured to use Time Division Multiplex (TDM), Internet Protocol (IP), Ethernet, optical networking, wireless protocols, or some other communication format—including combinations thereof. Core network transceiver 601 is configured to exchange user communications with a core network.

Access network transceivers 602 also comprise components that communicate over communication links, such as network cards, ports, RF transceivers, processing circuitry and software, or some other communication apparatus. Access network transceivers 602 may be configured to communicate over metallic, wireless, or optical links. Access network transceivers 602 may be configured to use Time Division Multiplex (TDM), Internet Protocol (IP), Ethernet, optical networking, wireless protocols, or some other communication format—including combinations thereof. Access network transceivers 602 are configured to exchange user communications and signaling with multiple wireless access networks.

Processing circuitry 605 comprises microprocessor and other circuitry that retrieves and executes operating software 607 from memory system 606. Processing circuitry 605 is typically mounted on one or more circuit boards that may also hold portions of memory system 606 and transceivers 601-602. Processing circuitry 605 may comprise single device or be distributed across multiple devices—including devices in different geographic areas. Processing circuitry 605 may be embedded in various types of equipment. Memory system 606 comprises a non-transitory storage medium, such as a disk drive, flash drive, data storage circuitry, or some other memory apparatus. Memory system 606 may comprise single device or be distributed across multiple devices—including devices in different geographic areas. Memory system 606 may be embedded in various types of equipment.

Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations. When executed by circuitry 605, operating software 607 directs processing system 603 to operate as described herein for a core network interface or PDSN.

In particular, buffer initiation module 608 directs processing system 603 to buffer user data in response to a buffer initiation signal for the user from a wireless access network. Data buffer module 609 stores the received user data. Data transfer module 608 directs processing system 603 to transfer the buffered user data to the user over the new wireless service link and packet connection.

Figure 7:
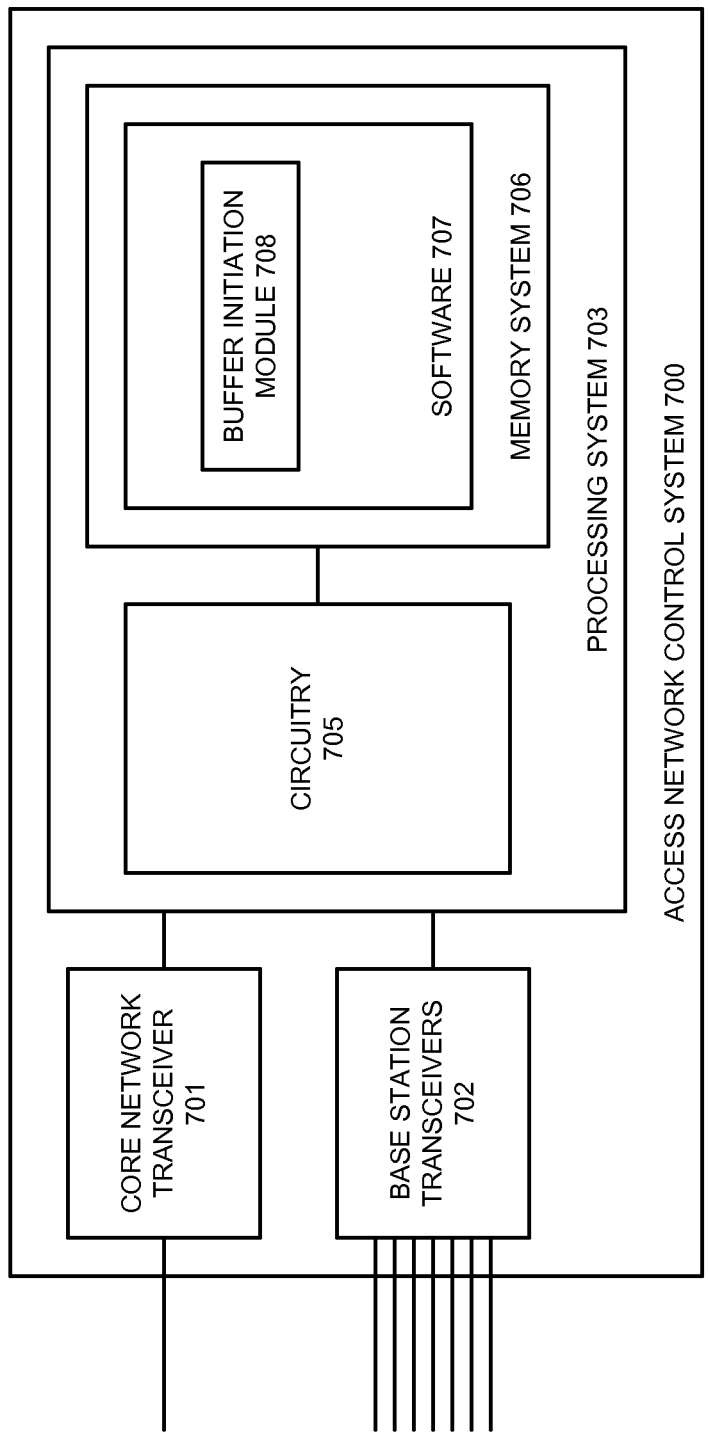
FIG. 7 illustrates a control system for a wireless access network to initiate data buffering at a core network interface for subsequent transfer the wireless access network.

FIG. 7 illustrates access network control system 700. Access network control system 700 provides an example of control systems in wireless access networks 101-102, BSC 313, and RNC 314, although these systems could use alternative configurations and operations. Access network control system 700 comprises core network transceiver 701, base station transceivers 702, and processing system 703. Processing system 703 is linked to transceivers 701-702. Processing system 703 includes processing circuitry 705 and memory system 706 that stores operating software 707. Operating software 707 comprises software module 708.

Core network transceiver 701 comprises components that communicate over communication links, such as network cards, ports, RF transceivers, processing circuitry and software, or some other communication apparatus. Core network transceiver 701 may be configured to communicate over metallic, wireless, or optical links. Core network transceiver 701 may be configured to use Time Division Multiplex (TDM), Internet Protocol (IP), Ethernet, optical networking, wireless protocols, or some other communication format—including combinations thereof. Core network transceiver 701 is configured to exchange user communications and signaling with a core network interface.

Base station transceivers 702 also comprise components that communicate over communication links, such as network cards, ports, RF transceivers, processing circuitry and software, or some other communication apparatus. Base station transceivers 702 may be configured to communicate over metallic, wireless, or optical links. Base station transceivers 702 may be configured to use TDM, IP, Ethernet, optical networking, wireless protocols, or some other communication format—including combinations thereof. Base station transceivers 702 are configured to exchange user communications and signaling with multiple base stations.

Processing circuitry 705 comprises microprocessor and other circuitry that retrieves and executes operating software 707 from memory system 706. Processing circuitry 705 is typically mounted on one or more circuit boards that may also hold portions of memory system 706 and transceivers 701-702. Processing circuitry 705 may comprise single device or be distributed across multiple devices—including devices in different geographic areas. Processing circuitry 705 may be embedded in various types of equipment. Memory system 706 comprises a non-transitory storage medium, such as a disk drive, flash drive, data storage circuitry, or some other memory apparatus. Memory system 706 may comprise single device or be distributed across multiple devices—including devices in different geographic areas. Memory system 706 may be embedded in various types of equipment.

Operating software 707 comprises computer programs, firmware, or some other form of machine-readable processing instructions. Operating software 707 may include an operating system, utilities, drivers, network interfaces, applications, or some other type of software. In this example, operating software 707 comprises software module 708, although software 707 could have alternative configurations. When executed by circuitry 705, operating software 707 directs processing system 703 to operate as described herein for a wireless access network, BSC, or RNC. In particular, buffer initiation module 708 directs processing system 603 to transfer a buffer initiation signal for a user to a core network interface in response to the initial service request from the user.

Referring back to FIG. 1, wireless communication device 150 comprises Radio Frequency (RF) communication circuitry and an antenna. The RF communication circuitry typically includes an amplifier, filter, modulator, and signal processing circuitry. Wireless communication device 150 may also include a user interface, memory device, software, processing circuitry, or some other communication components. For example, wireless communication device 150 could comprise a phone, transceiver, computer, e-book, game console, Internet appliance, network interface card, media player, or some other wireless communication apparatus—including combinations thereof. Wireless network protocols that may be utilized by wireless communication device 150 include CDMA, Global System for Mobile communications (GSM), Universal Mobile Telecommunications System (UMTS), High-Speed Packet Access (HSPA), EVDO, Long Term Evolution (LTE), Worldwide Interoperability for Microwave Access (WiMAX), IEEE 802.11 protocols (Wi-Fi), Bluetooth, or some other wireless network protocol that facilitates communication for wireless communication device 150.

Wireless access networks 101-102 comprises RF communication circuitry and antennas. The RF communication circuitry typically includes amplifiers, filters, RF modulators, and signal processing circuitry. Wireless access networks 101-102 also include control systems that comprise communication transceivers, processing circuitry, memory systems, and software. Wireless access networks 101-102 may also include routers, servers, memory devices, software, processing circuitry, cabling, power supply, network communication interface, structural support, or some other communication apparatus. Wireless access networks 101-102 may include base stations, Internet access nodes, telephony service nodes, wireless data access points, base transceiver stations (BTS), base station controllers (BSC), Radio Network Controllers (RNC), radio base stations (RBS), Node B, enhanced Node B (eNode B), and others. Wireless network protocols that may be utilized by wireless access networks 101-102 include CDMA, GSM, UMTS, HSPA, EVDO, LTE, WiMAX, Wi-Fi, Bluetooth, or some other communication format—including combinations thereof.

Core network interface 103 comprises communication transceivers, processing circuitry, memory systems, and software. Core network interface 103 may reside in a single device or may be distributed across multiple devices. Core network interface 103 may be a discrete system or may be integrated within other systems. Core network interface 103 could be a PDSN, network control system, application server, or some other communication apparatus. Core network 104 may include routers, gateways, telecommunication switches, servers, processing systems, or other communication equipment and systems for providing communication services.

Wireless communication links 121-122 use the air or space as the transport medium. Wireless communication links 121-122 may use various protocols, such as CDMA, GSM, UMTS, HSPA, EV-DO, LTE, WiMAX, Wi-Fi, Bluetooth, or some other communication format—including combinations thereof. Wireless communication links 121-122 may comprise many different signals sharing the same link. For example, wireless communication link 121 could include multiple signals operating in a single propagation path comprising multiple communication sessions, frequencies, timeslots, transportation ports, logical transportation links, network sockets, IP sockets, packets, or communication directions—including combinations thereof.

Communication links 123-125 use metal, air, space, optical fiber such as glass or plastic, or some other material as the transport medium—including combinations thereof. Communication links 123-125 could use various communication protocols, such as TDM, IP, Ethernet, telephony, optical networking, hybrid fiber coax (HFC), communication signaling, wireless protocols, or some other communication format—including combinations thereof. Communication links 123-125 may be direct links or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   in a core network interface, receiving first user data from a core network for delivery to a wireless communication device and transferring the first user data to a first access network that wirelessly transfers the first user data to the wireless communication device;
   in a second access network, wirelessly receiving a service request from the wireless communication device, and in response, transferring a buffer initiation signal to the core network interface for the wireless communication device, establishing a wireless service link to the wireless communication device, and transferring a packet connection request to the core network interface for the wireless communication device;
   in the core network interface:
   a) receiving second user data for delivery to the wireless communication device and transferring the second user data to the first access network,
   b) buffering the second user data in response to the buffer initiation signal,
   c) establishing a packet connection to the wireless communication device in response to the packet connection request, and
   d) transferring the buffered second user data to the second access network over the packet connection;
   in the second access network, wirelessly transferring the second user data to the wireless communication device over the wireless service link and packet connection; and
   wherein transferring the buffer initiation signal comprises transferring an A11 initial packet connection request with a lifetime of zero as a dummy request.

2. The method of claim 1 wherein the core network interface comprises a packet data service node.

3. The method of claim 1 wherein the first access network comprises a base station controller.

4. The method of claim 1 wherein the second access network comprises a radio network controller.

5. The method of claim 1 wherein the first access network comprises a code division multiple access 1x network and the second access network comprises an evolution data optimized network.

6. The method of claim 1 wherein the first user data and the second user data comprise Internet data.

7. The method of claim 1 wherein the service request comprises a route update message.

8. The method of claim 1 wherein establishing the packet connection to the wireless communication device comprises establishing a Point-to-Point Protocol (PPP) connection to the wireless communication device.

9. A communication system comprising:
   a core network interface configured to receive first user data from a core network for delivery to a wireless communication device and transfer the first user data to a first access network that wirelessly transfers the first user data to the wireless communication device;
   a second access network configured to wirelessly receive a service request from the wireless communication device and responsively transfer a buffer initiation signal to the core network interface for the wireless communication device, establish a wireless service link to the wireless communication device, and transfer a packet connection request to the core network interface for the wireless communication device;
   the core network interface is configured to:
   a) receive second user data for delivery to the wireless communication device and transfer the second user data to the first access network,
   b) buffer the second user data in response to the buffer initiation signal,
   c) establish a packet connection to the wireless communication device in response to the packet connection request, and
   d) transfer the buffered second user data to the second access network over the packet connection; and
   the second access network is configured to wirelessly transfer the second user data to the wireless communication device over the wireless service link and packet connection; and
   wherein transferring the buffer initiation signal comprises transferring an A11 initial packet connection request with a lifetime of zero as a dummy request.

10. The communication system of claim 9 wherein the core network interface comprises a packet data service node.

11. The communication system of claim 9 wherein the first access network comprises a base station controller.

12. The communication system of claim 9 wherein the second access network comprises a radio network controller.

13. The communication system of claim 9 wherein the first access network comprises a code division multiple access 1x network and the second access network comprises an evolution data optimized network.

14. The communication system of claim 9 wherein the first user data and the second user data comprise Internet data.

15. The communication system of claim 9 wherein the service request comprises a route update message.

16. The communication system of claim 9 wherein the packet connection comprises a Point-to-Point Protocol (PPP) connection.

\* \* \* \* \*